Figure 1:
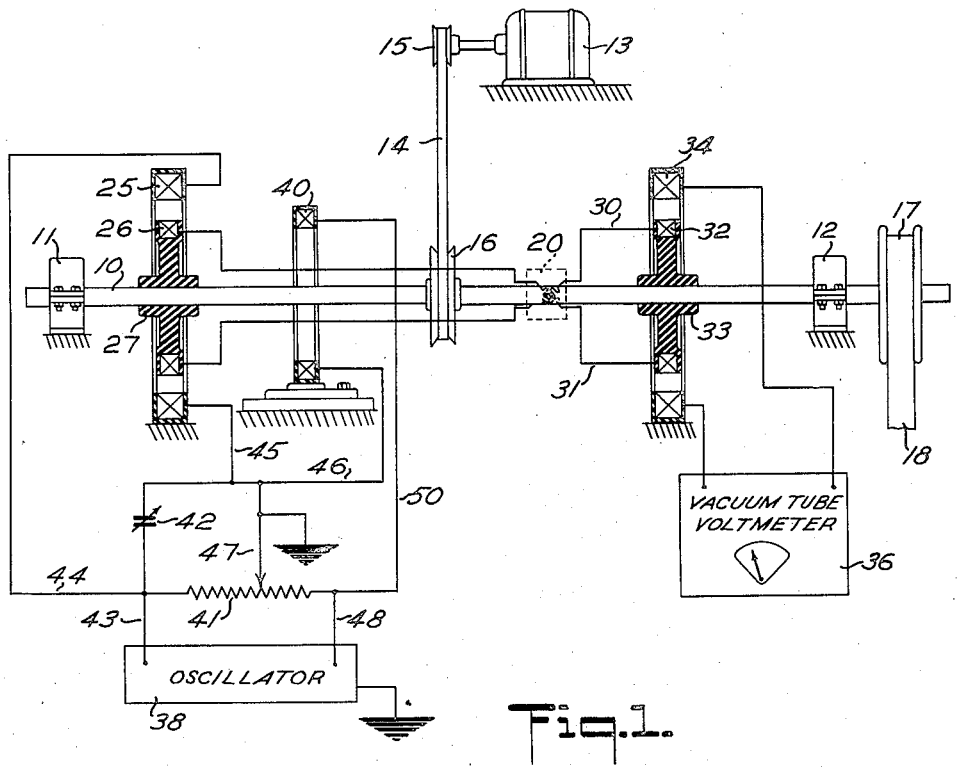

April 10, 1951    H. SCHAEVITZ    2,548,397
APPARATUS FOR MEASURING AND TRANSMITTING
A CONDITION FROM A ROTATABLE MEMBER
Filed May 26, 1945    2 Sheets-Sheet 1

INVENTOR.
HERMAN SCHAEVITZ
BY
ATTORNEY

INVENTOR.
HERMAN SCHAEVITZ
BY
ATTORNEY

Patented Apr. 10, 1951

2,548,397

UNITED STATES PATENT OFFICE 2,548,397

APPARATUS FOR MEASURING AND TRANSMITTING A CONDITION FROM A ROTATABLE MEMBER

Herman Schaevitz, Collingswood, N. J., assignor to Baldwin-Lima-Hamilton Corporation, a corporation of Pennsylvania Application May 26, 1945, Serial No. 595,910

12 Claims. (Cl. 73—136)

1

This invention relates to electrical systems of the type in which it is important to eliminate in one part of the system the effects of a magnetic field produced by a different part of the system and has for an object the provision of a simple and reliable means for neutralizing in one part of the system the effects of the magnetic field produced by a different part of the system.

The present invention is generally applicable to apparatus that is responsive to, or is adapted to measure, many different conditions but for purposes of illustration and explanation of the invention it is shown as applied to systems for measuring the strain in a rotating member such as a shaft with loads of constant or varying magnitude applied thereto. For simplicity in explaining the problems and solutions involved in my invention I will refer only to torque measurements although terminology identifying the other conditions could be equally as well used together with descriptions of specific pickup devices responsive to such conditions.

The accurate measurement of torque in rotating shafts has heretofore been a very difficult and imperfectly solved problem whether slip rings and brushes were used to transmit measured conditions from the shaft or inductive type "slip rings" were used.

In carrying out the present invention in one form thereof, condition-responsive electrical impedance means, one form of which is specifically shown herein as strain-responsive means, is secured to the rotating member whose torque is to be measured. The strain-responsive means is preferably gages comprising a length of electrical resistance wire, securely attached to the shaft, varying in resistance in accordance with the torsional strain at the surface of the shaft itself. The resistance change, though not very great, is adequate sufficiently to vary an electrical current, or other electrical condition, for reliable measurement thereof. Nevertheless, the quantities involved are relatively small and thus the presence of stray magnetic fields introduces substantial inaccuracies in the measurements.

Electrical power is supplied to the strain-responsive means by a pair of inductive coils, one of which is stationary and the other of which is secured to the shaft. Power is supplied to the stationary coil. The rotatable coil acts like the secondary of a transformer and supplies power to the strain-responsive means. Variations in the applied power are produced by the strain-responsive means in response to application of torque. There is also included in circuit with

2 the strain-responsive means a second rotatable coil inductively associated with a second stationary coil. The second rotatable coil induces in the stationary coil voltage variations which may be detected by suitable measuring apparatus.

The present invention, in its preferred form, is particularly characterized by the location of a winding which is energized with power whose magnitude and phase are so controlled as to neutralize the effect upon the second pair of coils of the magnetic field from the first pair of coils. Inasmuch as the shaft itself is generally of magnetic material, the two pairs of windings are magnetically coupled together. Thus, the magnetic field from the first pair of windings may, by inductive effect on the second pair of windings, introduce substantial inaccuracies. However, by providing suitable means, such as a compensating winding, suitably energized and suitably located, the effect of such magnetic field may be neutralized so that there is no effect upon the second pair of windings of the magnetic field from the first pair of windings.

My invention also has a number of other outstanding features. Because of its simplicity it is easy to construct, there are no close mechanical tolerances involved yet a high accuracy of measurement is attained, no bearings are needed, there are no mechanical or electrical conductive contacts between the movable and stationary parts of the instrument, there is little, if any, maintenance required and there are no speed limitations. Furthermore, torque can be measured under the most adverse conditions, whether the shaft be run under sea water or subject to a corrosive atmosphere and the electrical system carried by the rotating shaft may be brought into electrical balance without adjustment of any part of the rotatable system. It is of interest that axial or transverse motion of the movable member, e. g. the rotating shaft, relative to the stationary portion or member is permitted over appreciable limits without sacrifice of accuracy.

Figure 2:
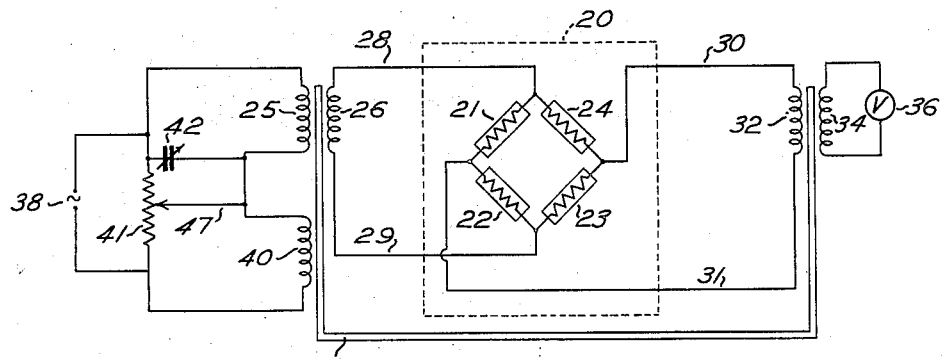
Figure 3:
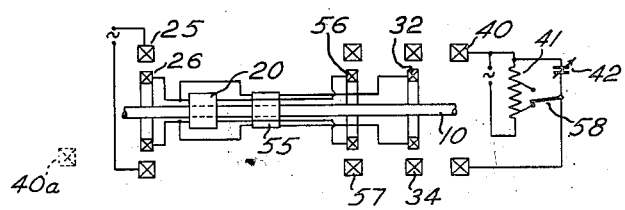

For a more complete understanding of the invention and for further objects and advantages thereof, reference should be had to the following description taken in conjunction with the accompanying drawings, in which:

Fig. 1 diagrammatically illustrates the invention as applied to the measurement of the torque of a shaft;

Fig. 2 schematically illustrates the wiring diagram of the system of Fig. 1;

Fig. 3 diagrammatically illustrates a modification of the invention; and

Figure 4:
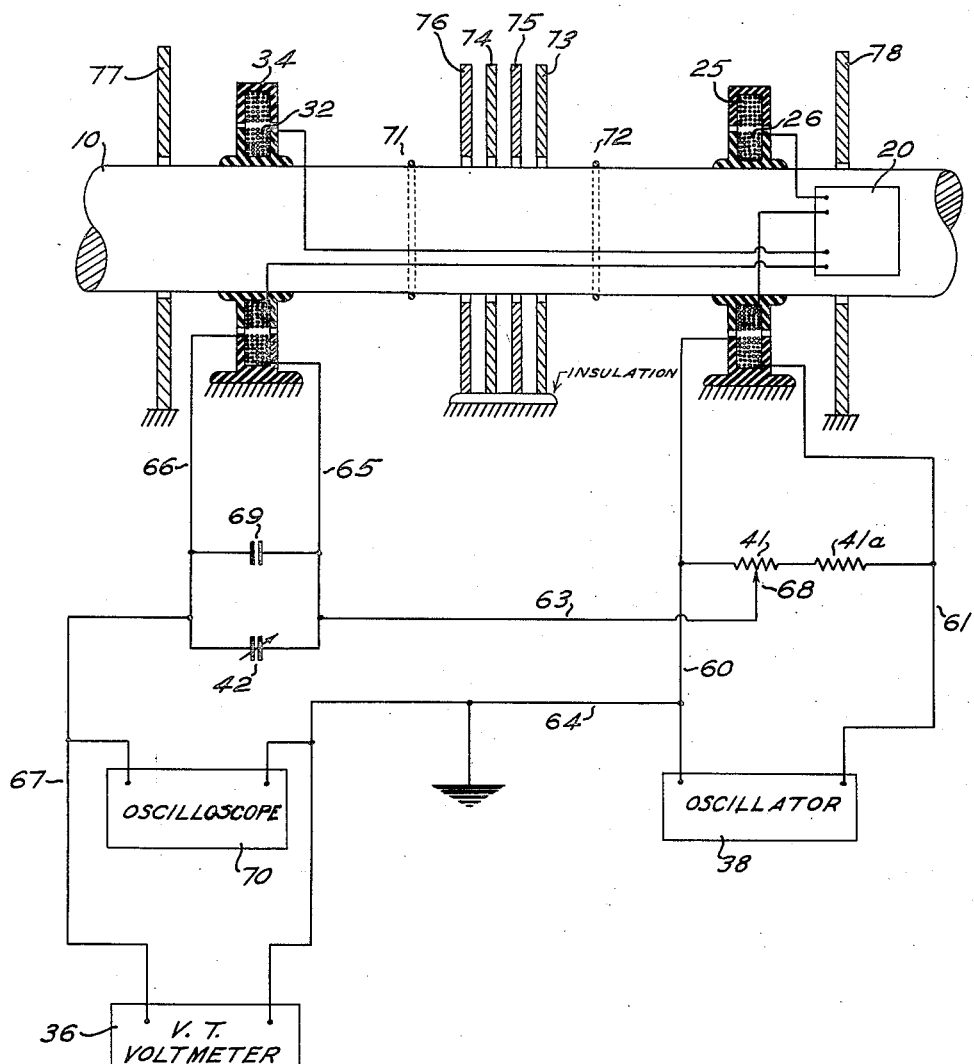

Fig. 4 diagrammatically illustrates a further modification of the invention.

Referring to the drawings, the invention in one form has been shown as applied to the measurement of the torque of a shaft 10, journaled in bearings 11 and 12. A motor 13, by means of a belt 14 and pulleys 15 and 16, drives the shaft 10, and by means of a driven pulley 17 and a belt 18 applies torque to a suitable load (not shown). This load may be a braking means, an electrical generator, or other device for applying a load of desired magnitude on the shaft 10.

In order to measure the torque on the shaft, there is secured to it condition-responsive means 20 specifically shown for purposes of illustration as bonded wire type strain gages whose electrical resistance varies in accordance with the torsional strain at the surface of the shaft itself. In the preferred form of the invention, the strain-responsive means 20 comprises four strain gages of the type disclosed in Simmons Patent No. 2,292,549. The strain gages 21, 22, 23 and 24, Fig. 2, are respectively cemented to the shaft and are connected to form a Wheatstone bridge. More specifically, the strain gages 21—24 are equally spaced circumferentially of the shaft and each gage forms a 45° angle with a line extending through one end thereof and parallel with the axis of the shaft 10. In other words, the strain gage 21 may be located on one side of the shaft while the strain gage 23 will be located in a diametrically opposite position. The strain gages 22 and 24 are disposed midway of the gages 21 and 23 and in diametrically opposite positions. One pair of diametrically opposite gages is subjected to tensional strains while the other pair is subjected to compressional strains.

By so locating the gages 21—24, the system will be to large extent responsive only to torsional strain. Moreover, while diametrically opposite strain gages 21 and 23 may be subjected to tension, the diametrically opposite gages 22 and 24 will be simultaneously subjected to compression. In consequence, the resistance of gages 21 and 23 will increase while the resistance of gages 22 and 24 will decrease. The Wheatstone bridge will, therefore, have maximum sensitivity because all resistances change in a direction to produce unbalance thereof in the same direction.

In accordance with the invention, electrical power is supplied to the strain-responsive means comprising the Wheatstone bridge 20 by means of a first pair of coils or windings 25 and 26. The winding or coil 25 is stationary. It has been illustrated as circular, though other shapes may be used. It is preferably disposed coaxially of the shaft 10. The coil or winding 26 is secured to and carried by the shaft 10, as by means of the sleeve or hub 27. Since the coil 26 is inductively located with respect to coil 25, current will be induced from coil 25 into the coil 26, and by means of the conductors 28 and 29 current will flow to the strain-responsive means 20. The amount of current, or the voltage across the output conductors 30 and 31 of the strain-responsive means 20, will vary as the resistances of the gages 21—24 vary. Included in the output circuit is a coil or winding 32 also secured to the shaft 10 by means of a sleeve or hub 33. A stationary coil or winding 34 is disposed in inductive relation to the winding 32. The current variations in the coil 32 thereby generate a voltage in the coil 34 which may be readily measured, recorded or used in a controller by any suitable and well-known means one form of which may be a sensitive voltmeter. A vacuum tube voltmeter 36, of conventional design is shown for purposes of illustration.

In the preferred form of the invention, the coil or winding 25 is energized from any suitable alternating current source, such as from an oscillator 38, of conventional design. As above explained, the magnetic field produced by the windings 25 and 26 will tend to affect the windings 32 and 34. The two pairs of windings, 25—26 and 32—34, are magnetically coupled together by the shaft 10. This coupling is diagrammatically shown by the double lines marked 10a in Fig. 2. Thus, though the return path between the respective pairs of coils is through the air, nevertheless, the magnetic field from the input coils 25 and 26 will be of sufficient intensity to affect the output from the coil or winding 34.

In order to avoid the influence of the magnetic field on the output windings 32—34, a compensating coil 40 is so located and is energized in such a manner as to neutralize at the output windings 32—34 the effect thereon of the magnetic field from the input windings 25—26. In the modification of Fig. 1, the compensating coil 40 is located between the input and output coils 25—26 and 32—34, though it may be located on either side thereof, or it may be laterally spaced from the shaft 10. The coil or winding 40 is energized from the oscillator 38 through a potentiometer and phase-shifting network comprising a resistor 41 and a capacitor 42. More specifically, it will be observed that the coil or winding 25 is energized through a circuit which may be traced from one side of the oscillator by way of conductors 43 and 44 to one side of the coil 25, by conductors 45, 46 and 47 to the movable contact on the resistor 41, through the right-hand side of resistor 41, and by conductor 48 to the other side of the oscillator. The compensating coil or winding 40 is energized from one side of the oscillator 38 through a circuit which may be traced by conductors 43 and 44, the left-hand side of resistor 41, conductors 47 and 46, the coil 40, and by conductors 50 and 48 to the other side of the oscillator. Thus, by varying the position of the contact with respect to the resistor 41, the relative degree of energization as between the input coil 25 and the compensating coil 40 may be controlled as desired.

The resistor 41 will be adjusted so that sufficient current will flow in the compensating winding 40 to produce a magnetic field in the region of the output coils 32—34, having an intensity just sufficient to neutralize the magnetic field produced in that same region by the input coil 25.

Thus far, reference has been made to the production of a magnetic field by the coil 40 which neutralizes in the region of the output coils the magnetic field of the input winding 25. From a more technical point of view, the explanation may also be in terms of the magnetomotive force produced by the respective coils. Technically, the explanation in terms of magnetomotive force is more accurate, though the explanation in terms of the magnetic fields has been presented because visualization of the operation may be more graphically presented thereby.

Not only must the intensity of the magnetomotive force produced by the coil 40 oppose that of the input coil 25 in the region of coils 32—34, but it must also have the correct phase relation so that it opposes it at all times and not for a fraction of each cycle of the applied input current. The phase of the current and of the magnetomotive force produced by the coil 40 may be readily controlled by adjusting the variable capacitor 42. It is so adjusted that it produces the correct phase relationship so that in conjunction with the variable resistor 41 exact compensation is had.

In the operation of the system, after the foregoing adjustments are made, the vacuum tube voltmeter 36, which may be calibrated directly in torque, foot-pounds, if desired, will read zero under conditions where no load is applied to the shaft 10. In other words, the Wheatstone bridge will be in balance inasmuch as the four strain gauges 21—24 will each have the same resistance before application of a strain thereto. However, the output from the bridge 20 will increase as torque is applied thereto and the meter 36 will deflect an amount related to the magnitude of the torque applied to the shaft 10.

As an example of the other applications to which my invention may be put, reference may be had to Fig. 3. In Fig. 3, two strain-responsive devices 20 and 55 have been applied to a shaft 10. The input coils 25 and 26 and the output coils 34 and 32 cooperate with the strain-responsive means 20 in manner already described. However, the strain-responsive means 55, energized from the input coils 25 and 26, may be selected to measure the thrust or axial strain, or any bending of the shaft or temperature, or it may measure other changes which may be of interest to the investigator involving a rotating structure. Accordingly, the output from the strain-responsive means 55 is applied to a second pair of output coils 56 and 57. Due to the axial displacement as between output coils 32—34 and 56—57, it will be seen that the compensating or bucking coil 40 will not be simultaneously effective on both sets of output coils. However, by arranging a switch 58 to vary the connections with respect to the resistor 41, the compensating coil will function exactly to neutralize the magnetic field in the region of coils 56 and 57 with the switch 58 in one position. By moving the switch to its second position, the magnetic field in the region of coils 32—34 will be neutralized. Corresponding changes of the capacitor 42 may sometimes be required. Thus a single neutralizing coil 40 may be utilized to select the particular location in which the effect of the magnetic field will be neutralized. Of course, there may be as many neutralizing coils as there are output windings. There may be a multiplicity of input and output coils with as many compensating coils as needed.

Further in accordance with the invention, the neutralizing coil 40 may be located in any position in the vicinity of the input and output coils. For example, it may be located in the position illustrated by the coil 40a shown by the broken lines in Fig. 3. It will function whether the plane of the coil be coaxial with the shaft 10 or whether the plane of the coil be normal thereto, or any position therebetween.

As regards the frequency of the applied voltage, it may be selected for the particular application. Frequencies as low as 60 cycles per second and as high as 10,000 cycles per second have been found to be satisfactory. For the lower frequencies the magnetic flux in the shaft 10 is more uniformly distributed whereas for the higher frequencies the skin effect becomes more pronounced and the effect of the material of which the shaft is made is less. Where the shaft is of non-magnetic material, the higher frequencies are preferred. They are also preferred for torque-measuring instruments whose operations are to large degree independent of the differing materials of shafts whose torque is to be measured. For convenience, a wide spacing has been shown between the various sets of coils. These coils may be closely spaced. For example, the coil 26 may have an inner diameter but slightly larger than the shaft 10. The coil 25 may have an inner diameter somewhat larger than the outer diameter of coil 26. Eccentric movement of coil 26 within coil 25 will have a negligible effect on the operation, particularly when the shaft 10 is of magnetic material and a low frequency is used.

The coil 40 may be of any convenient size and positioned in any convenient place near to the other coils. The output coils 32—34 may be closely located and of the same size or of a size differing from that of the input coils.

In summary, it is seen that the torque-measuring system does not require any close tolerances; there is nothing critical about the coupling between any of the coils. No special bearings have been provided for the rotating parts and there are no circuits requiring conductive contacts between the rotor and stator windings. There will be little if any maintenance. For exceedingly high speeds of rotation of the shaft, the rotating coils may be made of relatively small diameter to minimize the centrifugal force and so that they may be readily and securely attached to the shaft. Thus, the torque-measuring system does not of itself limit the permissible speed of rotation of the shaft. By applying suitable coverings for the coils, the shaft and the coils may be operated under corrosive conditions, whether immersed in corrosive liquids, sea water, or whether disposed in a corrosive atmosphere.

The strain gages themselves are available on the market with the resistances thereof accurately determined. They may be readily and securely cemented to the shaft in the desired locations. Even though there be some differences between the resistances of the strain gages 21—24, either at the time of installation or differences which may arise during operation, nevertheless, the Wheatstone bridge or other balanceable network used, may be balanced without disturbing the network itself, as by internal adjustments thereof. The network which includes the compensating coil 40 serves a further function of securing initial balance of the measuring network. Specifically, when the movable contact or resistor 41 and the capacitor 42 have been moved to positions where the voltmeter 36 has a zero reading, it will be apparent that there is zero output across the input to the voltmeter. Specifically, if the bridge should be slightly out of balance, the unbalance current flowing in the conductors 30 and 31 would produce a deflection of, or indication on, the voltmeter 36. However, the resistor 41 and the capacitor 42 are initially adjusted for zero output. Thus, the effect of initial unbalance of the bridge is neutralized, and the voltmeter 36 will initially read zero.

In the foregoing modifications of the invention the compensating coil effectively neutralized the effects on the output windings 32—34 of the magnetic fields from the input windings 25—26. In accordance with the embodiment of the invention of Fig. 4, the effect on the output windings of the magnetic fields from the input windings has been eliminated without the use of such a coil. The system of Fig. 4 has many parts serving the same functions as of the above described modifications of the invention. In Fig. 4 they have been identified by the same reference characters. More particularly, the network of strain gages is mounted on the shaft 10 as indicated by the rectangle 20. Electrical power, at any suitable frequency, for example, 20,000 cycles per second, is supplied to the network or measuring circuit from an oscillator 38 by way of conductors 60 and 61 which lead to the input coil 25. Current is induced in the secondary coil or winding 26, which winding of course is connected to the network indicated by the rectangle 20. The output from that network, as before, is applied to the rotating output coil 32 which is inductively associated with the output winding 34.

In order to avoid the inductive effects on the output windings 32—34 of the magnetic field produced by the windings 25—26 several provisions have been made. The principal provision comprises adjustable resistor 41 which may include a fixed resistor 41a connected across the input conductors 60 and 61. A voltage of relatively small magnitude, derived from resistors 41 and 41a is introduced by conductors 63 and 64 into the output circuit which includes conductors 65 and 66. This circuit may be traced from one side of the coil or winding 34 by way of conductors 65 and 63, resistor 41, conductors 60 and 64, the vacuum tube voltmeter 36, and by conductors 67 and 66 to the other side of the output coil 34. The magnitude of the voltage, so introduced, is primarily under the control of the movable tap 68 associated with the resistor 41. The phase relation of that voltage is under the control of capacitors 42 and 69. The tap 68 and the capacitor 42 are adjusted so that the voltage introduced is of equal magnitude and of opposite phase to that introduced by the magnetic fields from the input coils 25—26. Initially, before application of torque to the shaft 10, an oscilloscope 70 connected across the conductors 64 and 67 may be utilized to facilitate the adjustment of the phase-shifting means 41—42.

Further in accordance with the invention there may be provided single-turn short-circuited coils 71 and 72 disposed around the shaft 10. Magnetic flux induced in the shaft 20 by the coils 25 and 26 will be opposed by the short-circuited turns 71 and 72 and will thus minimize the amount of flux passing through the coils 32 and 34. Further to decrease the magnetic flux reaching these coils, magnetic shields 73 and 74 may be located between the input and output coils. These shields may be of iron or an alloy thereof, having good magnetic properties. To minimize the effect of the electric field, additional shields 75 and 76 may be provided. These comprise a material which is a good electrical conductor, such for example as copper. Additional shields 77 and 78 of copper may also be provided on the opposite sides of the coils from the shields 73—76. Additional magnetic shields may be similarly provided if desired. The provision of the various shields assists in minimizing the voltages produced in the output coils 32—34 and in some cases the corrective voltage may be of very small magnitude.

In all forms of the invention, there is provided a means of neutralizing or overcoming voltages in the output coil 34 arising from other than unbalance of the electrical network indicated by the rectangle 20, that is, from the mutual inductive effects as between the input windings 25—26 and the output windings 32—34. The input and output windings have mutual induction which by itself would produce an undesired voltage effect in the output circuit. In Fig. 1, a compensating coil 40, constituting electrical means, counteracts the mutual induction so that no undesired voltage effects are present, thereby allowing the indicating, recording or controlling means 36 to be subject only to the output voltage of the condition responsive means 20. Broadly, a similar operation is present in Fig. 4 wherein resistors 41, 41a and capacitors 69 and 42, constituting electrical means, counteracts the inductive voltage effects so that no undesired voltage reaches the indicating, recording or controlling means 36 or 70 and therefore these are subject only to the output voltage of the condition responsive means 20 the same as in Fig. 1. The term indicating, recording or controlling means is broadly referred to herein as signal controlled means.

Now that certain modifications of the invention have been described it will be apparent to those skilled in the art that other modifications may be made and that the invention may be applied to electrical systems and responsive conditions of widely differing character without departing from the true spirit and scope of the invention as set forth in the appended claims.

I claim:

1. An electrical system for measuring a condition on a rotatable member comprising an input circuit including a stationary input winding encircling the axis of rotation of said member and energized by alternating current, a secondary input winding mounted for rotation with said member about said axis and inductively associated with said stationary input winding, a pair of inductively associated output windings axially spaced from said input windings and one of which is stationary and the other rotatable with said member about its axis of rotation, condition responsive electrical impedance means rotatable with said member and connecting said secondary winding to the rotatable one of said output windings, a compensating winding disposed in the vicinity of said input winding and said output windings, and means for energizing said compensating winding with alternating current of an amplitude and phase relation which with respect to that applied to said input winding substantially neutralizes in the region of said output windings the effect of a magnetic field which would otherwise exist due to the energization of said input winding.

2. In a torque-measuring system of the type in which electrical strain-responsive means is secured to and whose electrical impedance varies in accordance with strain of a rotatable member subject to torque, the combination of a pair of stationary windings spaced one from the other along said member, a pair of windings carried by said rotatable member and respectively disposed in inductive relation with said stationary windings and connected in an electrical circuit with said strain responsive means, and means including a compensating winding disposed within the vicinity of said windings for substantially neutralizing the effect on one pair of inductively associated windings of the magnetic field which would otherwise be produced by the other set of inductively associated windings.

3. In a torque meter having strain-responsive means secured to a rotating member subject to torque, the combination of a pair of windings, one of which is stationary and the other of which is rotatable with said member and inductively associated with said stationary winding, a second pair of windings, one of which is stationary and the other of which is rotatable with said member and inductively associated with said second stationary winding, means connecting said strain-responsive means in circuit with said rotatable windings, means for energizing one of said stationary windings to supply power to said strain-responsive means, measuring means responsive to the output of the other stationary winding, and a compensating winding disposed with respect to said two pairs of windings for producing a magnetic field which substantially neutralizes in the region of said last-named stationary winding the effect of the magnetic field which would otherwise be produced by the stationary winding which supplies power to said strain-responsive means.

4. The combination set forth in claim 1 further characterized by the provision of means including a resistor and a capacitor for controlling the relative energization of said compensating winding and of the other of said input windings for neutralization by said compensating winding of the effect in the region of said output windings of the magnetic field which would otherwise be produced therein by said input windings.

5. An electrical system comprising a pair of inductively associated input windings, a second pair of inductively associated output windings, a measuring circuit including a balanceable network, means connecting said circuit to one winding of each of said pairs of windings, a compensating winding disposed within the vicinity of said pairs of windings, means for controlling the relative energization of the other of said input windings and of said compensating winding comprising a resistor and a capacitor, and means responsive to unbalance of said network, said resistor and said capacitor being adjustable to compensate for initial unbalance of said network and for substantial neutralization in the region of said output windings of the effect of the magnetic field which would otherwise be produced by said input windings.

6. An electrical system comprising a pair of inductively associated input windings, a second pair of inductively associated output windings, means including a plurality of strain gages forming a Wheatstone bridge circuit, means for connecting one winding of each of said pairs of windings across the respective diagonals of said bridge, a measuring device connected to the other of said output windings, means to compensate for initial unbalance of said bridge including a compensating coil, and means for controlling the relative energization of said compensating coil and the other of said input windings for controlling the phase and amplitude of current supplied thereto for neutralization in the region of said output windings of the effect of a magnetic field which would otherwise be produced therein by said input windings.

7. A torque-measuring system for a drive shaft comprising a pair of inductively associated input windings, a second pair of inductively associated output windings, torque-responsive means including a plurality of strain gages secured to said shaft and connected to form a Wheatstone bridge circuit, means for connecting one winding of each of said pairs of windings across the respective diagonals of said bridge, a measuring device connected to the other of said output windings, means to compensate for initial unbalance of said bridge including a compensating coil, and means for controlling the relative alternating current energization of said compensating coil and the other of said input windings for controlling the phase and amplitude of the alternating current supplied thereto for neutralization in the region of said output windings of the effect of a magnetic field which would otherwise be produced therein by said input windings.

8. An electrical system comprising first and second pairs of inductively associated windings, means mounting like coils of said pairs for rotation, means including an alternating current input circuit for at least one winding of the first of said pairs, condition responsive electrical impedance means rotatable with the rotatable pair of coils, means connecting said impedance means to the other winding of said first pair of windings to receive current from the input circuit, means forming an output circuit including at least one winding of the second of said pairs, means connecting said impedance to the other winding of said second pair of windings, a compensating winding disposed within the vicinity of said pairs of coils, and means for controlling the energization of said compensating winding as regards phase and amplitude of said alternating current for neutralization in the region of any selected pair of said coils of the magnetic field which would otherwise exist in said selected region.

9. In combination, a rotating member having condition responsive electrical impedance means rotatable therewith, inductively associated output windings one of which is rotatable with said rotating member and has an electrical connection with said condition responsive means to transmit a signal voltage therefrom, a plurality of windings certain of which are spaced along said rotatable member with their fields bucking each other, a circuit including at least certain of said plurality of windings one of which is stationary for supplying power to said condition responsive means, and said output windings being so disposed with respect to the windings whose fields are in bucking relation to each other that substantially only a signal voltage is transmitted from the output windings.

10. In combination, a rotating member having condition responsive electrical impedance means rotatable therewith, inductively associated output windings one of which is rotatable with said rotating member and has an electrical connection with said condition responsive means to transmit a signal voltage therefrom, a plurality of windings spaced along said rotatable member with their fields bucking each other and one of which is stationary, an alternating current power supply circuit connected to each of said spaced windings to simultaneously energize the same in substantially opposed phase relation so as to effect said bucking action, means for inductively receiving said power and transmitting it to said condition responsive means, and said output windings being so disposed with respect to the windings whose fields are in bucking relation to each other that substantially only a signal voltage is transmitted from the output windings.

11. In combination, a rotating member having condition responsive electrical impedance means rotatable therewith, inductively associated output windings one of which is rotatable with said rotating member and has an electrical connection with said condition responsive means to transmit a signal voltage therefrom, a plurality of windings spaced along said rotatable member with their fields bucking each other and one of which is stationary, an alternating current power supply circuit connected to each of said spaced windings to simultaneously energize the same in substantially opposed phase relation so as to effect said bucking action, means for inductively receiving said power and transmitting it to said condition responsive means, said output windings being so disposed with respect to the windings whose fields are in bucking relation to each other that substantially only a signal voltage is transmitted from the output windings, and means for varying the division of power between said spaced windings thereby to control the degree of bucking action and the location of the output windings.

12. In combination, a rotating member having condition responsive electrical impedance means rotatable therewith, inductively associated output windings one of which is rotatable with said rotating member and has an electrical connection with said condition responsive means to transmit a signal voltage therefrom, a plurality of windings spaced along said rotatable member with their fields bucking each other and one of which is stationary, an alternating current power supply circuit connected to each of said spaced windings to simultaneously energize the same in substantially opposed phase relation so as to effect said bucking action, means for inductively receiving said power and transmitting it to said condition responsive means, said output windings being so disposed with respect to the windings whose fields are in bucking relation to each other that substantially only a signal voltage is transmitted from the output windings, and means for variably controlling the phase relation between the spaced windings.

HERMAN SCHAEVITZ.

REFERENCES CITED

The following references are of record in the file of this patent:

UNITED STATES PATENTS

| Number | Name | Date |
|---|---|---|
| Re. 21,003 | Knerr et al. | Feb. 14, 1939 |
| 1,765,715 | Byers | June 24, 1930 |
| 1,892,826 | Bettison et al. | Jan. 3, 1933 |
| 1,954,975 | Zuschlag | Apr. 17, 1934 |
| 2,077,161 | Zuschlag | Apr. 13, 1937 |
| 2,102,452 | Zuschlag | Dec. 14, 1937 |
| 2,337,352 | Sitterson et al. | Dec. 21, 1943 |
| 2,354,130 | Langer et al. | July 18, 1944 |
| 2,386,008 | Shank | Oct. 2, 1945 |
| 2,392,293 | Ruge | Jan. 1, 1946 |
| 2,415,513 | Martin et al. | Feb. 11, 1947 |
| 2,431,260 | Langer | Nov. 18, 1947 |

FOREIGN PATENTS

| Number | Country | Date |
|---|---|---|
| 470,454 | Germany | Jan. 15, 1929 |